United States Patent
LeGrand

(10) Patent No.: US 7,166,980 B1
(45) Date of Patent: Jan. 23, 2007

(54) METHODS AND APPARATUS FOR MONITORING A BRUSHED PERMANENT MAGNET MOTOR USING BACK-EMF MEASUREMENTS

(76) Inventor: Richard Mark LeGrand, 701 Landon La., Austin, TX (US) 78705

( * ) Notice: Subject to any disclaimer, the term of this patent is extended or adjusted under 35 U.S.C. 154(b) by 0 days.

(21) Appl. No.: 11/356,473

(22) Filed: Feb. 17, 2006

Related U.S. Application Data

(60) Provisional application No. 60/655,660, filed on Feb. 23, 2005.

(51) Int. Cl.
*H02P 5/68* (2006.01)

(52) U.S. Cl. .................. 318/459; 318/568.11; 318/248; 388/928.1

(58) Field of Classification Search ........ 318/244–245, 318/248, 459, 565, 599–600, 568.11; 388/909, 388/928.1
See application file for complete search history.

(56) References Cited

U.S. PATENT DOCUMENTS

| | | | | |
|---|---|---|---|---|
| 4,266,168 A | * | 5/1981 | Andersen | 388/822 |
| 4,893,067 A | * | 1/1990 | Bhagwat et al. | 388/823 |
| 4,965,848 A | * | 10/1990 | Vasconi et al. | 388/815 |
| 5,811,946 A | * | 9/1998 | Mullin et al. | 318/254 |
| 5,990,643 A | | 11/1999 | Holling et al. | |
| 6,040,671 A | | 3/2000 | Brito et al. | |
| 6,100,656 A | | 8/2000 | El-Sadi et al. | |
| 6,144,198 A | | 11/2000 | Howard et al. | |
| 6,184,645 B1 | | 2/2001 | Brito et al. | |
| 6,204,629 B1 | | 3/2001 | Rote et al. | |
| 6,246,193 B1 | | 6/2001 | Dister | |
| 2003/0141836 A1 | | 7/2003 | Brito | |

OTHER PUBLICATIONS

Stephen J. Chapman. "Electric Machinery Fundamentals", third edition, McGraw-Hill, 1999, p. 36 shows an equation (1-47) for calculating a motor current from applied voltage and back emf.*
Fishbane et al. "Physics for Scientist and Engineers", second edition, vol. 1, Prentice Hall, 1996. p. 237, equations (9-2) and (9-3) show the relationship between angular velocity and angular position of a rotating rigid body.*

* cited by examiner

*Primary Examiner*—Bentsu Ro
(74) *Attorney, Agent, or Firm*—Knobbe Martens Olson & Bear LLP

(57) ABSTRACT

Techniques sense a back-emf voltage from a brushed permanent magnet motor. Such techniques can be used for a variety of purposes, such as to estimate the current that is being applied to the motor, to estimate the motor's velocity, position, torque, and the like. One aspect of the invention includes the deactivation of power applied to the motor, and the monitoring of the back-emf of the voltage while power is not applied.

20 Claims, 7 Drawing Sheets

METHODS AND APPARATUS FOR MONITORING A BRUSHED PERMANENT MAGNET MOTOR USING BACK-EMF MEASUREMENTS

CROSS-REFERENCE TO RELATED APPLICATION

This application claims the benefit under 35 U.S.C. § 119(e) of U.S. Provisional Application No. 60/655,660, filed Feb. 23, 2005, the entirety of which is hereby incorporated by reference.

FIELD OF THE INVENTION

This invention generally relates to sensing of brushed permanent magnet motors. Such sensing can include being able to determine at least one of the motor's velocity, position, torque, applied current or combinations thereof.

DESCRIPTION OF THE RELATED ART

Motor control can be broadly classified into two categories: open-loop and closed-loop control. Open-loop control is the simplest type of motor control. With open-loop control, the motor performs a specified motion to the best of its ability, but if the motor encounters an unexpected force, the actual motion will deviate from the commanded motion. An open-loop controller has no knowledge of the motor's motion and therefore cannot correct for motion errors.

Closed-loop controllers, on the other hand, use feedback of the motor's motion to control the motor. For example, if a motor is commanded to go a specific velocity and encounters increased drag or resistance, the closed-loop controller can sense the reduced velocity and increase the power to the motor to compensate.

Closed-loop control uses a method of sensing the motion of the motor. For example, an optical-mechanical encoder can correspond to a rotating slotted disk placed between a light source and a detector to infer position. An optical-mechanical encoder exhibits no drift, has a digital output that integrates easily with digital controllers, and has a long lifetime. However, in high volume applications, the optical-mechanical encoder can be relatively expensive and use extra cabling.

Mechanical encoders can correspond to switches that are triggered by the motor's motion to infer position. Mechanical encoders typically exhibit no drift, but are typically expensive, use extra cables, impose drag, use switch debouncing circuits, operate at relatively low speeds, and have a relatively short lifetime.

Hall effect sensors can also be used. A Hall effect sensor in combination with a magnet can sense passage of metallic (ferrous) gear teeth to infer position. Hall effect sensors typically exhibit no drift. can use existing gear in gear trains, but are typically expensive, use extra cables, use extra magnets, and use a ferrous gear.

Many closed-loop motor controllers use optical-mechanical encoders for position feedback. Drawbacks of this feedback method include the high cost and the added mechanical complexity. Often, the cost of the optical encoder exceeds the cost of the motor itself.

SUMMARY

One embodiment is a method of ascertaining an operating condition of a brushed permanent magnet motor (brushed PMM), where the method includes: applying power to the brushed PMM when motorized power is desired; deactivating the power applied to the brushed PMM; measuring a back-emf voltage of the brushed PMM while power is deactivated; and integrating the measured back-emf voltage over time to estimate a position of a motor shaft of the brushed PMM.

One embodiment is an apparatus for ascertaining an operating condition of a brushed permanent magnet motor (brushed PMM), where the apparatus includes: a controller configured to permit power to be applied to the brushed PMM motor when motorized power is desired, the controller further configured to be able to deactivate the power applied to the brushed PMM; and a measurement circuit configured to measure a back-emf voltage emanating from the PMM when the PMM is powered off; wherein the controller is configured to integrate the measured back-emf voltage over time to estimate a position of a motor shaft of the brushed PMM.

One embodiment is an apparatus of ascertaining an operating condition of a brushed permanent magnet motor (brushed PMM), where the apparatus includes: means for applying power to the brushed PMM; means for deactivating the power applied to the brushed PMM; means for measuring a back-emf voltage of the brushed PMM while power is deactivated; and means for integrating the measured back-emf voltage over time to estimate a position of a motor shaft of the brushed PMM.

BRIEF DESCRIPTION OF THE DRAWINGS

These drawings and the associated description herein are provided to illustrate specific embodiments of the invention and are not intended to be limiting.

DETAILED DESCRIPTION

Embodiments of the invention advantageously provide techniques for sensing a back-emf voltage from a brushed permanent magnet motor. Such techniques can be used to estimate the current that is being applied to the motor, the motor's velocity, position, torque, and the like. One aspect of the invention includes the deactivation of power applied to the motor, and the monitoring of the back-emf of the voltage while power is not applied. Advantageously, embodiments of the invention can be implemented at relatively low cost and are suitable for a wide variety of applications, such as control or monitoring of motors for applications such as, but not limited to, robots, radio-controlled cars and planes, and the like.

Figure 1:
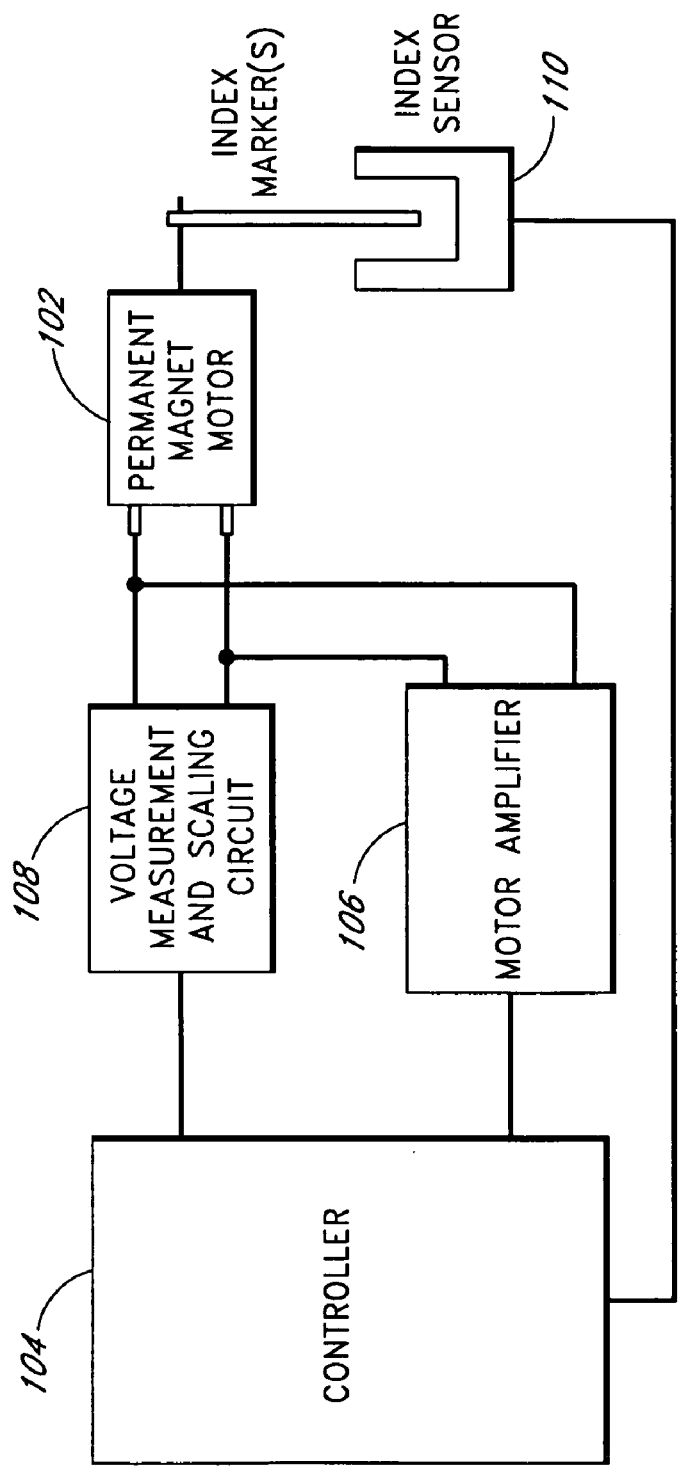
FIG. 1 illustrates an example of a system diagram of sensing the back-emf of a permanent magnet motor.

FIG. 1 illustrates an example of a system diagram of sensing the back-emf of a permanent magnet motor 102. The system can include, for example, a controller 104, a motor amplifier 106, and a voltage measurement and scaling circuit 108. Further details of the scaling circuit 108 will be described later in connection with a single-ended embodiment in FIG. 3 and a differential embodiment in FIG. 4. The system can optionally include an index sensor 110.

Back-emf feedback is based on the principle that an operating brushed permanent magnet motor generates a voltage that is typically proportional to the motor shaft's angular velocity. This is described by Equation 1 below:

$$V_{back\text{-}emf} = K_{back\text{-}emf} \dot{\theta}_{motor} \qquad (1)$$

In Equation 1, $K_{back\text{-}emf}$ is the back-emf constant of the motor, $\dot{\theta}_{motor}$ is the motor shaft velocity, and $V_{back\text{-}emf}$ is the resulting voltage generated by the motor, known as the back-emf voltage.

Thus, by measuring the back-emf voltage, the motor velocity can be inferred. Additionally, integrating the back-emf voltage measurements over time yields the motor's shaft position $\theta_{motor}$ relative to an arbitrary coordinate system as described by Equation 2.

$$\theta_{motor} = \frac{1}{K_{back\text{-}emf}} \int V_{back\text{-}emf} dt + c \qquad (2)$$

In Equation 2, the integration constant c is a fixed offset with respect to the chosen coordinate system and is commonly set to 0. Integrating the back-emf voltage over time can be easily accomplished with the controller 104 shown in FIG. 1, which can be embodied as an embedded microcontroller, as will be explained later.

Figure 2:
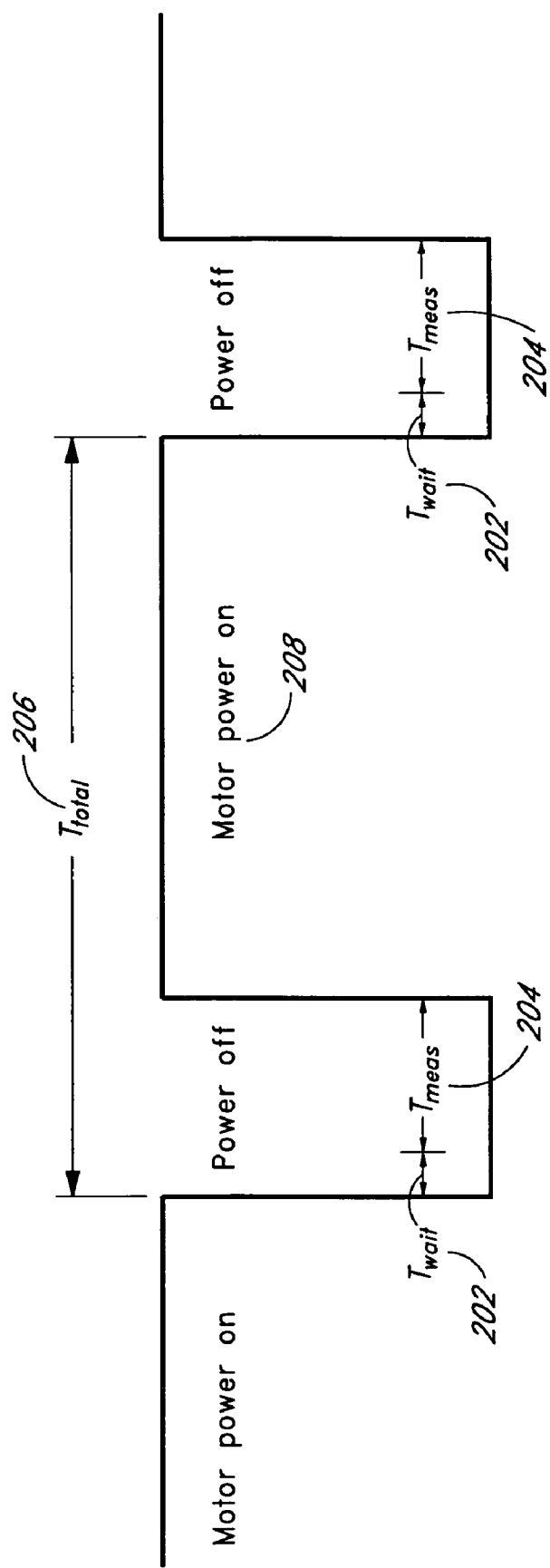
FIG. 2 illustrates a timing diagram of motor power switching.

A brushed permanent magnet motor 102 typically has two terminals through which it draws power. These same terminals can be used to measure the back-emf voltage, but it should be recognized that it is difficult to observe the back-emf voltage when power is applied to the motor 102. One solution to this problem is to repeatedly remove or disable power to the motor 102 via an electronic switch, such as via control of the motor amplifier 106. With power removed, the back-emf voltage can be measured with an analog to digital converter or similar device. It should also be noted that the measurement should be taken after the transient voltages from the motor's inductance or other sources subside as provided by time period $T_{wait}$ 202. This time period $T_{wait}$ 202, the back-emf measurement period $T_{meas}$ 204 and the total period $T_{total}$ 206 are shown in FIG. 2. It should be understood that applicable time periods can vary depending on the particular motor being used and can vary in a very broad range. Applicable periods will be readily determined by one of ordinary skill in the art. In one example, a typical 9 Volt brushed permanent magnet motor worked well with $T_{total}$=5 ms, $T_{wait}$=50 µs, and $T_{meas}$=200 µs.

The back-emf voltage measurements collected in this way can be filtered to remove noise and then adjusted, e.g., multiplied by a constant, to obtain the velocity of the motor. In one embodiment, filtering includes taking multiple measurements and averaging them with, for example, a moving average. The constant, as implied by Equation 1, is the reciprocal of the back-emf constant $K_{back\text{-}emf}$.

As described before, the motor shaft position $\theta_{motor}$ can be obtained by integrating the back-emf voltage over time. Such integration, or summing, can be implemented with a processor, such as the controller 104. This can be implemented by adding the back-emf voltages in a running sum. This running sum multiplied by a constant provides an estimate of the relative position of the motor as described by Equation 3 below.

$$\hat{\theta}_{motor}(i) = K_{pos} \sum_{j=0}^{i} \tilde{V}_{back\text{-}emf}(j) + c \qquad (3)$$

In Equation 3, $\hat{\theta}_{motor}(i)$ is the position estimate at discrete time i, $\tilde{V}_{back\text{-}emf}(j)$ is the measured back-emf voltage at discrete time j, and $K_{pos}$ is a constant that is based on the back-emf constant $K_{back\text{-}emf}$ and the period between measurements $T_{total}$. Again, c is a fixed offset with respect to the chosen coordinate system and is commonly set to 0. In one embodiment, $K_{pos}$ is determined through a calibration process.

There are several details concerning the implementation of such a back-emf feedback system, which will be described in the following sections.

Single-Ended Back-emf Voltage Scaling and Measurement

An A/D converter is a device that converts the voltage of a signal into a form that can be easily interpreted by a digital controller or computer. The back-emf voltage is typically larger than the recommended maximum input voltage range of many analog to digital (A/D) converters. Furthermore, the back-emf voltage can be either positive or negative depending of the direction of movement of the motor shaft. This also presents a problem to most A/D converters, particularly those that accept only positive voltages as inputs. The circuit illustrated in FIG. 3 addresses these problems.

In the illustrated circuit, a voltage dividing circuit provided by resistors R1 and R2 reduces the back-emf voltage from the motor, and a voltage reference $V_{bias}$ biases or provides a DC offset such that the voltage into the A/D converter 302 is positive over the range of the back-emf voltage. This bias voltage can be selected to be about one-half of the maximum input voltage of the A/D converter 302, and should be selected such that the maximum range of back-emf voltages can be measured. Thus, negative back-emf voltages from the motor will not result in negative input voltages into the A/D converter 302. The voltage source $V_{bias}$ can be implemented with a precision voltage reference or another voltage source as will be readily recognized by one of ordinary skill in the art.

For example, in the illustrated embodiment, the selected A/D converter 302 had an input range of 0V and 3.3V. For example, a voltage $V_{bias}$=1.65V is an appropriate value. For example, a motor such as a Mabuchi RK 370-CA can be expected to generate up to 9V of back-emf voltage. For example, appropriate values of resistance include R1=5.76 k ohms, R2=3.32 k ohms, and R3=9.09 k ohms. This provides the A/D converter 302 with an input range of 0V to 3.3V that corresponds to the full −9V to 9V of the expected range of the motor's back-emf voltage. These resistor and bias voltage values can vary within a broad range. It will be understood, for example, that less than all of the range of the A/D converter 302 can be used. It should also be noted that the input range of A/D converters can vary. Other applicable values of resistance and bias voltage can be readily determined by one of ordinary skill in the art.

Figure 3:
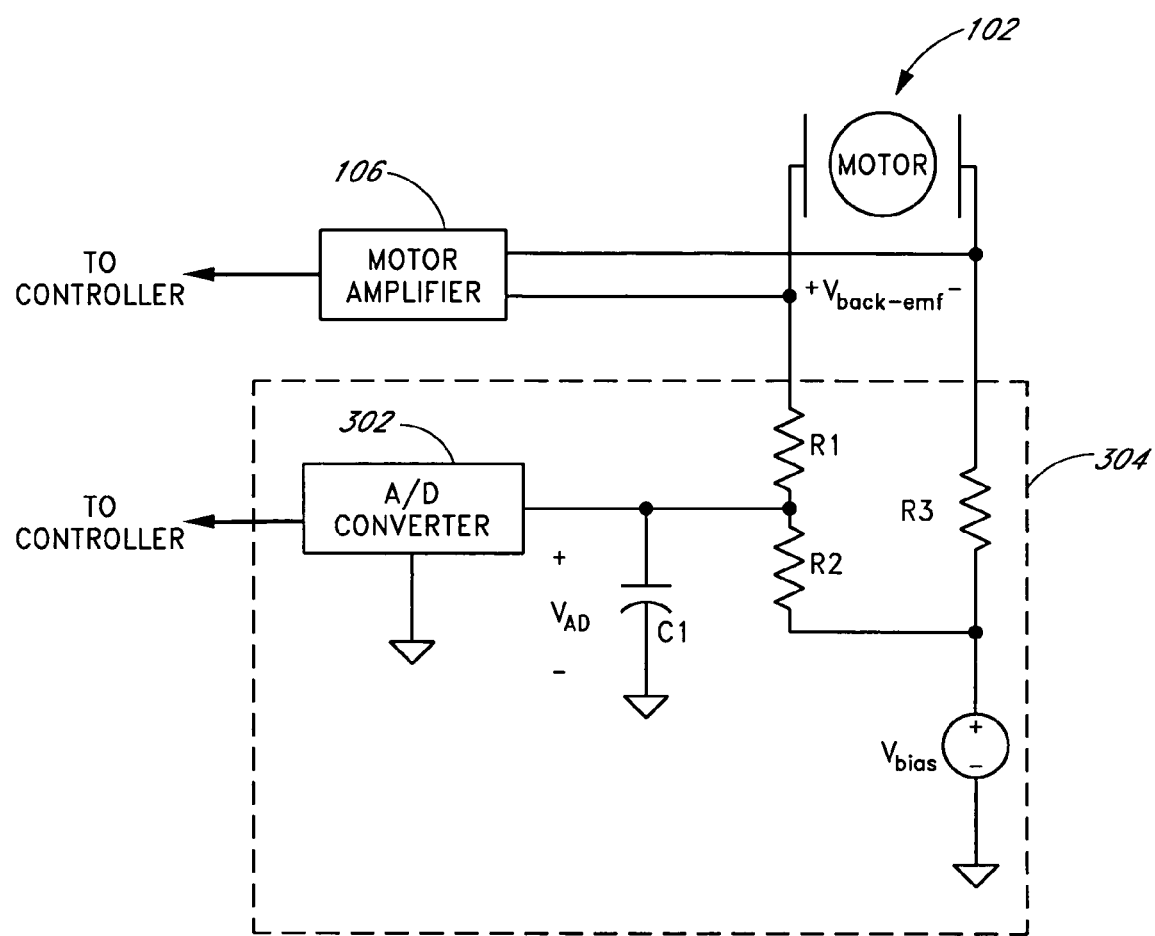
FIG. 3 illustrates an example of a circuit for single-ended back-emf sensing.

The capacitor C1 in the circuit illustrated in FIG. 3 together with resistor R1 form a low-pass filter that prevents aliasing from the A/D converter and filters high frequency noise that may be present. In one embodiment, capacitor C1 is selected such that $R1C1=T_{wait}/2$, or $C1=T_{wait}/(2R1)$. This choice of capacitance value for capacitor C1 provides noise filtering without interfering with the back-emf voltage measurement period $T_{meas}$. Other applicable values for capacitor C1 will be readily determined by one of ordinary skill in the art.

By applying simple circuit analysis to the circuit in FIG. 3, it is possible to infer $V_{back-emf}$ from the voltage measured ($V_{AD}$) by the A/D converter 302. Equations 4 and 5 describe the relationship between these voltages.

$$V_{AD} = V_{back-emf} \frac{R2}{R1+R2+R3} + V_{bias} \quad (4)$$

$$V_{back-emf} = (V_{AD} - V_{bias}) \frac{R1+R2+R3}{R2} \quad (5)$$

Also shown in FIG. 3 is the motor amplifier 106, which is typically a collection of four power transistors known as a full bridge or an H-bridge. The motor amplifier 106 controls how much power is delivered to the motor 102. The motor amplifier 106 can usually be disabled such that no significant power is supplied to the motor 102, which allows the back-emf voltage to be measured as depicted in FIG. 2. In FIG. 2, the sections labeled "power off" correspond to the motor amplifier 106 being disabled. When the motor amplifier 106 is disabled, the presence of the motor amplifier 106 should not affect the back-emf voltage significantly.

For example, when using an H-bridge circuit as the motor amplifier 106, the power to the motor 102 can be controlled through pulse-width modulated switching at a relatively high frequency such as 20 kHz. The pulse-width and duty cycle determines how much power is delivered to the motor 102 such that the wider the pulse width and the higher the duty cycle, the more power is delivered.

The pulse-width modulated switching takes place during the sections labeled "motor power on" 208 in FIG. 2. In the illustrated embodiment, this pulse-width modulated switching is separate from the switching that facilitates the measurement of the back-emf voltage, which is illustrated in FIG. 2. In another embodiment, these two types of switching are combined. In addition, the switching for the sensing of back-emf voltage is distinct from the switching of current to the motor via commutator brushes.

Differential Back-emf Voltage Scaling and Measurement

Differential A/D converters have two inputs and provide a representation of the difference between the two voltages at their inputs that can be easily interpreted by a digital controller or computer. These converters provide an advantage of being able to measure both terminals of the motor simultaneously for a more accurate measurement of the back-emf voltage. The circuit illustrated in FIG. 4 uses a differential A/D converter 402.

Similar to the single-ended circuit of FIG. 3, a voltage dividing circuit provided by resistors R1 and R2 reduces the back-emf voltage from one motor terminal and a voltage dividing circuit provided by resistors R3 and R4 reduces the voltage from the other motor terminal. A voltage reference ($V_{bias}$) biases or provides a DC offset such that the voltages into the A/D converter 402 are positive over the possible range of the back-emf voltages. This bias voltage can be selected to be about one-half of the maximum input voltage of the A/D converter 402, and should be selected such that the maximum range of back-emf voltages can be measured.

Thus, negative back-emf voltages from the motor will not result in negative input voltages into the A/D converter 402. The voltage source $V_{bias}$ can be implemented with a precision voltage reference or another voltage source.

For example, in the illustrated embodiment, the selected A/D converter 402 had an input range of 0V and 3.3V. For example, a voltage $V_{bias}=1.65V$ is an appropriate value. For example, a motor 102 such as a Mabuchi RK 370-CA can be expected to generate up to 9V of back-emf voltage. For example, appropriate values of resistance include R1=5.76 k ohms, R2=3.32 k ohms, R3=5.76 k ohms, and R4=3.32 k ohms. This provides the A/D converter 402 with input ranges of 0V to 3.3V for both inputs that correspond to the full −9V to 9V of the expected range of the motor's back-emf voltage. These resistor and bias voltage values can vary within a broad range. Other applicable values of resistance and bias voltage can be readily determined by one of ordinary skill in the art.

Figure 4:
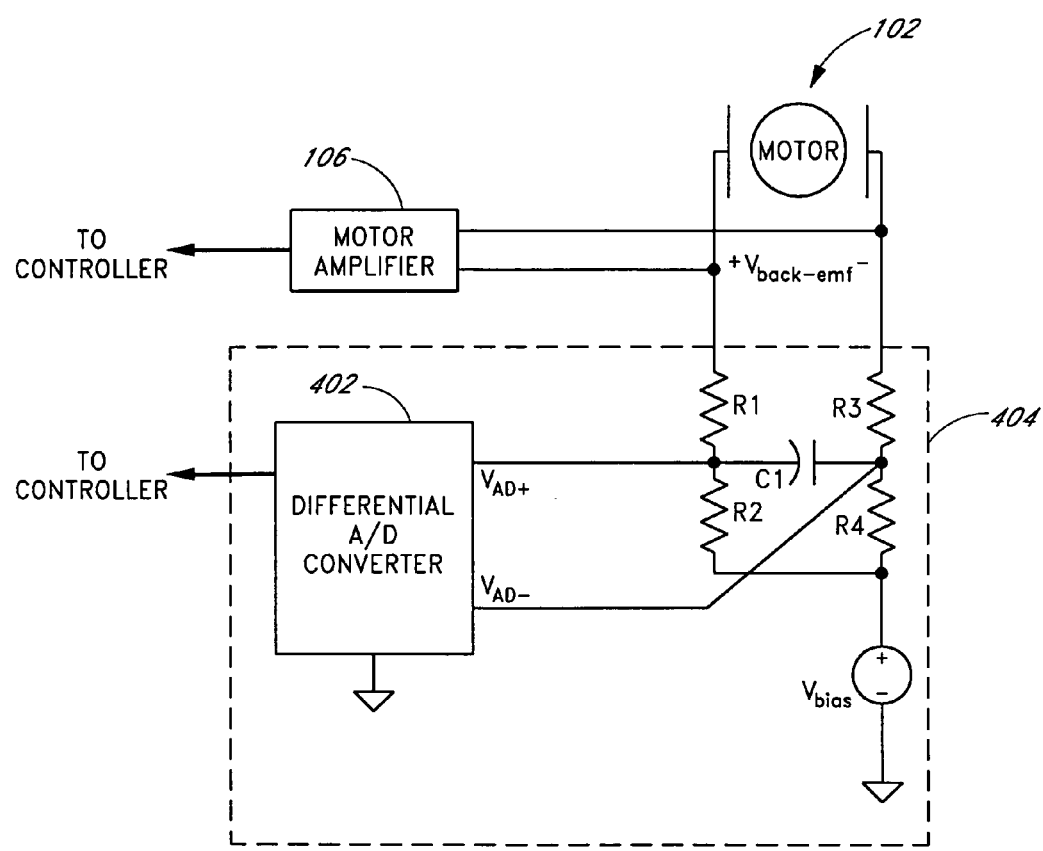
FIG. 4 illustrates an example of a circuit for differential back-emf sensing.

The capacitor C1 in FIG. 4 together with resistors R1 and R3 form low-pass filters that prevent aliasing from the A/D converter 402 and cleans up high frequency noise that may be present. In one embodiment, resistors R1 and R3 have the same value, and C1 is selected such that $R1C1=T_{wait}/2$, or $C1=T_{wait}/(2R1)$. This choice of value for capacitor C1 provides noise filtering without interfering with the back-emf voltage measurement period $T_{meas}$. Other applicable values for capacitor C1 will be readily determined by one of ordinary skill in the art.

It is possible to infer $V_{back-emf}$ from the voltage measured by the differential A/D converter ($V_{AD}$). Equations 6 and 7 describe the relationship between $V_{back-emf}$ and the differential A/D converter inputs $V_{AD+}$ and $V_{AD-}$. Equation 8 combines Equations 6 and 7 to form the differential A/D converter measurement ($V_{AD}$). Equation 9 is an expression for $V_{back-emf}$ based on the expression for $V_{AD}$ in Equation 8.

$$V_{AD+} = V_{back-emf} \frac{R2}{R1+R2+R3+R4} + V_{bias} \quad (6)$$

$$V_{AD-} = -V_{back-emf} \frac{R4}{R1+R2+R3+R4} + V_{bias} \quad (7)$$

$$V_{AD} = V_{AD+} - V_{AD-} = V_{back-emf} \frac{R2+R4}{R1+R2+R3+R4} \quad (8)$$

$$V_{back-emf} = V_{AD} \frac{R1+R2+R3+R4}{R2+R4} \quad (9)$$

Equations 8 and 9 illustrate that $V_{bias}$ affects the differential circuit in FIG. 4 less than the single-ended circuit in FIG. 3. This can be advantageous in certain applications because $V_{bias}$ may be affected by noise or vary across different temperatures or across other environmental variables.

Estimation and Removal of Back-emf Voltage Measurement Bias

With most voltage measuring circuits that use A/D converters, there is often the presence of a nonzero measurement bias voltage $V_{AD-bias}$. For example, this bias voltage results in a non-zero voltage measurement when the actual voltage that is desired to be measured is zero. This measurement bias voltage $V_{AD-bias}$ can result in inaccurate voltage measurements if it is not known to a reasonable degree of accuracy.

$$V_{AD} = V_{actual} + V_{AD-bias} \quad (10)$$

Not knowing the bias voltage can be problematic when attempting to sum the back-emf voltages as in Equation 3 because error in the measured bias voltage $V_{AD\text{-}bias}$ can lead to larger errors that accumulate over time. This accumulated error is known as drift.

Removing the measured bias voltage $V_{AD\text{-}bias}$ from each measurement can be accomplished easily by solving for the actual voltage $V_{actual}$ in Equation 10, assuming that the value of the bias voltage is known or can be determined.

A method of estimating the bias voltage for the single-ended circuit in FIG. 3 includes electrically disconnecting the motor amplifier 106 and motor 102 from the measurement circuit 304 and hence setting the actual voltage $V_{actual}$ to the bias voltage $V_{bias}$. The measured voltage ($V_{AD}$) is then the sum of the bias voltage $V_{bias}$ and the measured bias voltage $V_{AD\text{-}bias}$. It is then possible to solve for the measured bias voltage $V_{AD\text{-}bias}$ since the bias voltage $V_{bias}$ should be known. An accurate measurement of the measured bias voltage $V_{AD\text{-}bias}$ can be obtained by taking many (e.g., hundreds or thousands) of voltage readings obtained in this manner over time and averaging them. In one embodiment, this process takes place upon initialization or before the motors are used. After the measured bias voltage $V_{AD\text{-}bias}$ is known, it can be subtracted from the measured voltage $V_{AD}$ to obtain a more accurate value of the actual voltage $V_{actual}$. In one embodiment, the measured bias voltage $V_{AD\text{-}bias}$ is stored in the controller 104, and the controller 104 subtracts the bias voltage from the measured voltage $V_{AD}$ in firmware or software.

For the differential circuit in FIG. 4 determining the measured voltage bias $V_{AD\text{-}bias}$ is similar to the process used for the single-ended circuit in FIG. 3. When electrically disconnecting the motor amplifier 106 and motor 102 from the measurement circuit 404, the actual voltage $V_{actual}$ becomes 0. The measured voltage $V_{AD}$ is then the measured voltage bias $V_{AD\text{-}bias}$.

In a typical back-emf application, disconnecting the motor amplifier 102 entails turning off the transistors of an H-bridge circuit, if an H-bridge circuit is used for the motor amplifier 106. In a typical application, it may be assumed that if the motor shaft is stationary, it will not impart any significant voltage to the measurement circuit, which is effectively similar to the motor 102 being disconnected from the measurement circuit.

Estimation of Motor Current and Output Torque

Figure 5:
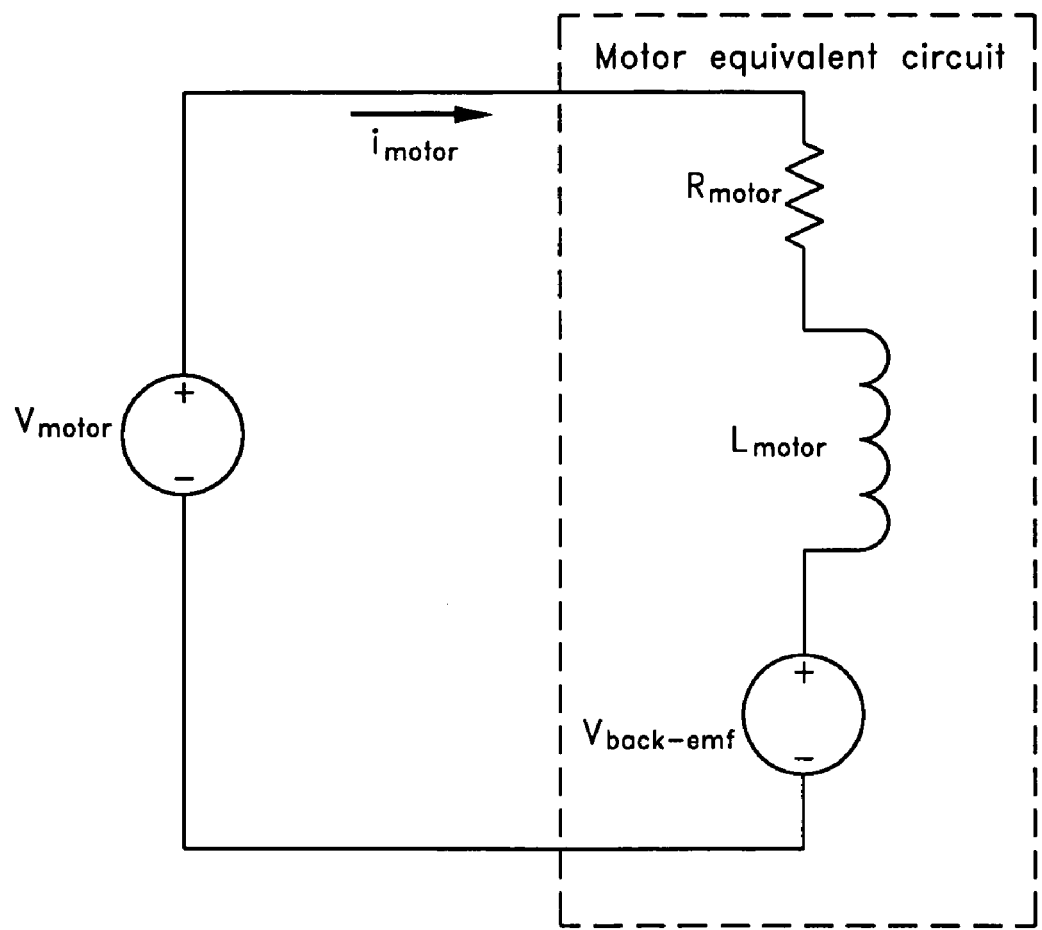
FIG. 5 illustrates a model of an equivalent circuit for a motor.

A brushed permanent magnet motor can be modeled as a voltage source with a series resistance and inductance as shown in FIG. 5.

By applying circuit analysis techniques on the circuit pictured in FIG. 5, it is possible to derive an expression for the motor current $I_{motor}$ assuming that the motor current is constant (steady-state). This assumption allows us to ignore the effects of the motor's series inductance $L_{motor}$.

$$I_{motor} = \frac{V_{motor} - V_{back\text{-}emf}}{R_{motor}} \quad (11)$$

In Equation 11 a drive voltage $V_{motor}$ is used to supply power to the motor 102 and variable $R_{motor}$ represents the series resistance of the motor 102.

The drive voltage $V_{motor}$ can be measured with the same measurement circuit in FIG. 3. Here, instead of measuring the voltage while the motor amplifier 106 is disabled, as when measuring the back-emf voltage, the voltage is measured when the motor amplifier 106 is on (during the sections labeled "motor power on" 208 in FIG. 2).

If an H-bridge is chosen as the amplifier 106 and pulse-width modulation is used to deliver varying amounts of power to the motor, capacitor $C_1$ and resistor $R_1$ in FIG. 3 can be used to filter out the high frequency components of the pulse-width modulation switching for the measurement of the drive voltage $V_{motor}$, which is made with the motor amplifier 106 activated. The filtered voltage that is measured by the A/D converter 302 will be the effective drive voltage $V_{motor}$ and can be used to Equation 11 to calculate the motor current.

The motor resistance $R_{motor}$ can be determined through a process of calibration that typically takes place before the motor 102 is used. For example, an ammeter can be used to measure the current into the motor $I_{motor}$. With $V_{motor}$ and $V_{back\text{-}emf}$ known through measurement techniques described previously, a value for $R_{motor}$ can be determined by rearranging and applying Equation 11. In one embodiment, the value determined for $R_{motor}$ using this process was stored in a processor's memory for later retrieval and application of Equation 11.

With the ability to calculate the motor current $I_{motor}$, the motor torque can be calculated by applying Equation 12 below.

$$\tau_{motor} = K_{back\text{-}emf} I_{motor} \quad (12)$$

Here, $\tau_{motor}$ is the output torque of the motor and $K_{back\text{-}emf}$ is the familiar back-emf constant which is equivalent to the motor's torque constant.

Position Error Correction by Using Index Markers

When applying Equation 3, noise sources or other unaccounted sources of error in the back-emf measurement ($\tilde{V}_{back\text{-}emf}(j)$) can create errors in the motor's position estimate, which can accumulate over time, a phenomenon that is known as drift. To correct for these errors and to provide an accurate position estimate, an index sensor 110 can be placed on the motor 102. For example, if the motor 102 is coupled to a gear train, this sensor can sense index markers on the input shaft, virtually anywhere within the gear train, or on the output shaft. The index sensor senses when one or more index markers coupled to the motor 102 or gear shaft are reached. The information from the index sensor can be used in a feedback algorithm to correct the motion estimates. For example, an index sensor can be accurate, but lack resolution, such as, lack the ability to resolve partial rotation. A back-emf based position estimate can have more resolution than an index sensor, but the accuracy of the position estimate can suffer from drift. In one embodiment, the accuracy of an index sensor is combined with the resolution of a back-emf sensor. In one embodiment, an infrared emitter/detector pair was used to sense an index marker on the output shaft of the motor 102. A similar embodiment is shown in FIG. 1.

For example, when motor and gear trains are rotating, index markers are typically sensed as the motor 102 rotates through the index point. The amount the motor 102 rotates in a given direction between two index markers is denoted as φ. Depending on the motion of the motor 102, a sensed index marker may indicate that the motor has rotated an amount of φ, implying positive motion, –φ, implying negative motion, or 0, implying that the motor 102 has switched directions and crossed the index marker without rotating any net amount between encountering index markers. These three possibilities are represented in Equation 13 below.

$$\phi(k) = \begin{vmatrix} \phi \\ 0 \\ -\phi \end{vmatrix} \quad (13)$$

Here, the integer variable k denotes the $k^{th}$ index marker encountered, and $\phi(k)$ is the distance that has been traversed between the $k^{th}$ index marker and the previously encountered index marker (k−1). By using the index markers, the motor's position can be determined by combining the $\phi(k)$ observations as in Equation 14.

$$\tilde{\theta}_{motor}(k) = \tilde{\theta}_{motor}(k-1) + \phi(k) \quad (14)$$

It is usually assumed that $\tilde{\theta}(0)$ is 0. Here, $\tilde{\theta}_{motor}(k)$ is the inferred position with respect to the $k^{th}$ observed index marker. This uses disambiguation of the motion into one of the three possibilities. By using the motor position estimated from the back-emf voltage measurements by applying Equation 3, this disambiguation is straightforward. For example, if the back-emf estimated motor position indicates significantly positive rotation since the last index marker, it can be determined that the motor has rotated an amount of $\phi$, If the back-emf estimated motor position indicates significantly negative rotation since the last index marker, it can be determined that the motor has rotated an amount of $-\phi$, If the back-emf estimated motor position indicates neither significant negative or positive rotation since the last index marker, it can be determined that the motor has rotated an amount of 0.

To estimate the motor position based on both the back-emf voltage and the index marker observations, Equation 15 below can be used.

$$\hat{\theta}_{motor}(i, k) = \hat{\theta}_{motor}(i(k)-1, k-1) + (1 + \alpha(k))K_{pos}\sum_{j=i(k)}^{i}\tilde{V}_{back-emf}(j) + c \quad (15)$$

In Equation 15, the integer variable i denotes the $i^{th}$ back-emf measurement, and i(k) denotes the value of i when the $k^{th}$ index marker is encountered. The most recent position estimate is $\hat{\theta}_{motor}(i,k)$ such that i and k are the most recent (largest) values.

In one embodiment, the scaling factor $\alpha(k)$ is updated when each index marker is encountered and is used to correct the position estimate based on the index marker observations. It will be understood that the scaling factor $\alpha(k)$ can also be updated less frequently. In one embodiment, the scaling factor $\alpha(k)$ is calculated by applying Equation 16 below.

$$\alpha(k) = f(e(k)) + \alpha(k-1) \quad (16)$$

It is usually assumed that $\alpha(0)$ is 0. Here, function $f$ is a function of the error when the $k^{th}$ index marker is encountered or e(k). This error is expressed by Equation 17 below.

$$e(k) = \tilde{\theta}_{motor}(k) - \hat{\theta}_{motor}(i(k), k) \quad (17)$$

The function $f(x)$ can be a function such that $f(x) = K_p x$ where $K_p$ is a scaling constant that can be determined empirically. However, it is possible that $f(x)$ includes other functions. Equation 17 represents where the two motor position estimates are combined to eventually form the combined, accurate position estimate of Equation 15.

Using a Single A/D Converter for Multiple Motors

Figure 6:
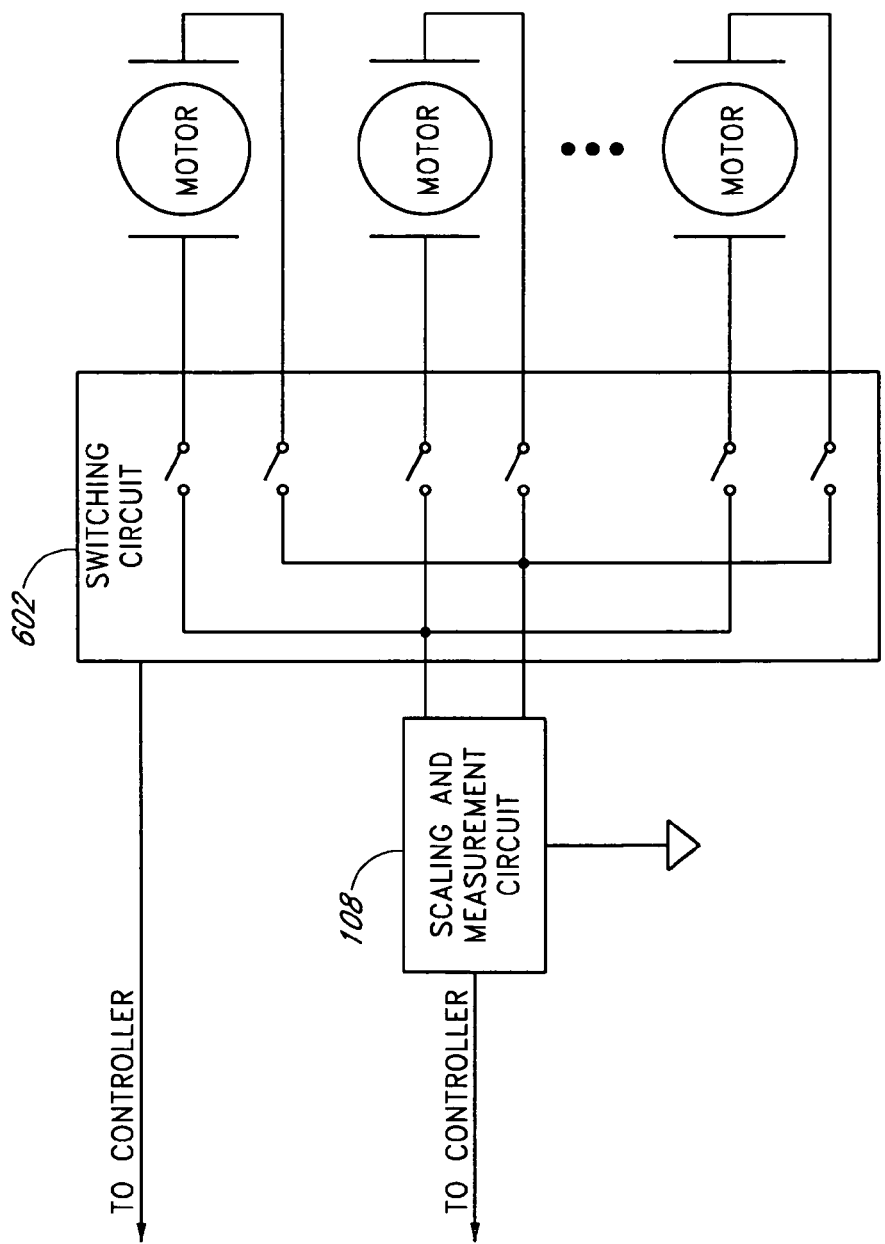
FIG. 6 illustrates an arrangement of switches, such as a multiplexer, which can be used to share a scaling and measurement circuit among more than one motor.

FIG. 6 illustrates an arrangement of switches, which can permit a single A/D converter and voltage scaling circuit to be used for sampling the back-emf voltage for multiple permanent magnet motors (PMMs). This can advantageously reduce cost. The controller 104 controls the switching circuit 602 such that the back-emf voltage can be sampled for a selected PMM. Since the back-emf is only sampled during the back-emf measurement period $T_{meas}$ 204 of a given PMM, the A/D converter and scaling circuit are free to sample other PMMs. The back-emf measurement period $T_{meas}$ for each PMM can be arranged in a staggered pattern over time such that at any given time, only a single PMM is sampled. The switches can be mechanical or electrical, such as, for example, electromagnetic relays, solid-state analog switches, or solid-state analog multiplexers. An example of an analog multiplexer that can be used is an Intersil DG409.

Figure 7:
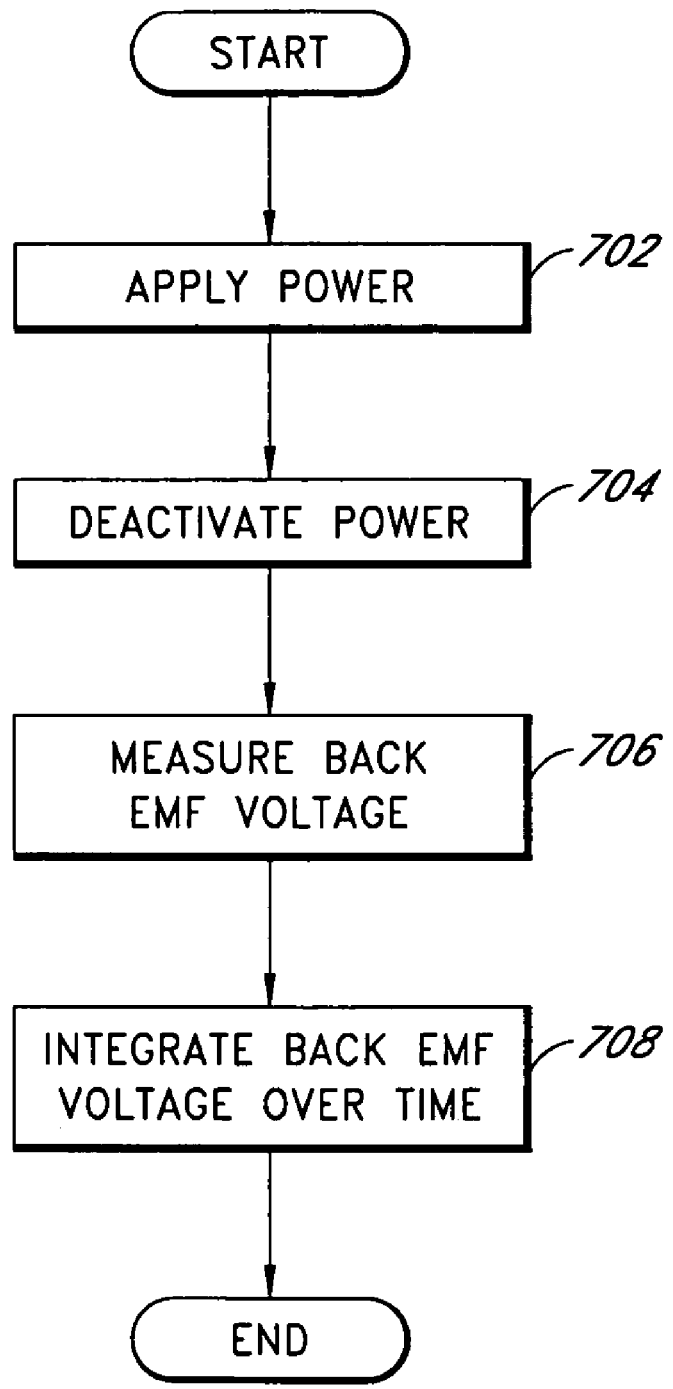
FIG. 7 is a flowchart, generally illustrating a process for sensing an operating condition of a brushed permanent magnet motor.

FIG. 7 is a flowchart generally illustrating a process for sensing of the back-emf voltage of a brushed permanent magnet motor (PMM). It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

In a state 702, power is applied to the motor. This state corresponds to the time period labeled "motor power on" 208 in FIG. 2. The amount of power applied to the motor can be based on the desired motion of the motor. Similarly, the amount of power can be zero, if no motorized power is desired. The process advances to a state 704.

In a state 704, the process deactivates power to the motor. This state corresponds to a time period labeled "power off" in FIG. 2. The process advances to a state 706.

In a state 706, the process measures the back-emf voltage. The process can wait for a time period $T_{wait}$ 202, can scale voltages, can provide DC offset voltages, can remove the DC offset voltages, and the like. The process advances to a state 708.

In the state 708, the process integrates the measured back-emf voltages over time. In one embodiment, the integration is performed by firmware executed in a microprocessor by computing a running sum as described earlier in connection with Equation 3. The process then ends and can be repeated as desired. The process can be used, for example, feedback control for a motorized device, such as a robot.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of ascertaining an operating condition of a brushed permanent magnet motor (brushed PMM) of a robot, the method comprising:
    applying power to the brushed PMM when motorized power is desired;
    deactivating the power applied to the brushed PMM;
    measuring a back-emf voltage of the brushed PMM while power is deactivated, wherein measuring further comprises compensating for a DC offset in the measured back-emf voltage; and integrating the measured back-emf voltage over time to estimate a position of a motor shaft of the brushed PMM for feedback control of the robot.

2. The method as defined in claim 1, wherein integrating comprises using a running sum.

3. The method as defined in claim 1, further comprising deliberately waiting at least a predetermined time period after deactivating the power before measuring the back-emf voltage, wherein the predetermined time period is sufficient to permit transients from inductance from the brushed PMM to dissipate.

4. The method as defined in claim 1, further comprising:
subtracting the measured back-emf voltage from a drive voltage applied to the motor to estimate a voltage drop across the brushed PMM; and
dividing the voltage drop by a stored resistance value for the brushed PMM to compute an estimate of an amount of current being driven through the brushed PMM when power is applied.

5. The method as defined in claim 1, further comprising controlling a switching circuit coupled to two or more motors to share a measurement circuit among the two or more motors.

6. The method as defined in claim 1, further comprising measuring the back-emf voltage from the brushed PMM using a differential analog-to-digital converter.

7. A method of ascertaining an operating condition of a brushed permanent magnet motor (brushed PMM), the method comprising:
applying power to the brushed PMM when motorized power is desired;
deactivating the power applied to the brushed PMM;
measuring a back-emf voltage of the brushed PMM while power is deactivated;
integrating the measured back-emf voltage over time to estimate a position of a motor shaft of the brushed PMM; and
adaptively adjusting a scaling factor used to compute position with the measured back-emf voltage at least partially in response to a detection of an index marker to correct for drift.

8. The method as defined in claim 7, further comprising using the motor shaft position estimate for feedback control of a motorized device.

9. The method as defined in claim 7, wherein measuring the back-emf voltage further comprises compensating for a DC offset in the measured back-emf voltage.

10. The method as defined in claim 7, further comprising using the motor shaft position estimate for feedback control of a robot.

11. An apparatus for ascertaining an operating condition of a brushed permanent magnet motor (brushed PMM) of a robot, the apparatus comprising:
a controller configured to permit power to be applied to the brushed PMM motor when motorized power is desired, the controller further configured to be able to deactivate the power applied to the brushed PMM; and
a measurement circuit configured to measure a back-emf voltage emanating from the PMM when the PMM is powered off, the measurement circuit further configured to compensate for a DC offset in the measured back-emf voltage;
wherein the controller is configured to integrate the measured back-emf voltage over time to estimate a position of a motor shaft of the brushed PMM for feedback control of the robot.

12. The apparatus as defined in claim 11, wherein the controller is configured to integrate by computing a running sum.

13. The apparatus as defined in claim 11, wherein the controller is further configured to:
subtract the measured back-emf voltage from a drive voltage applied to the motor to estimate a voltage drop across the brushed PMM; and
divide the voltage drop by a stored value related to a resistance of the brushed PMM to compute an estimate of an amount of current being driven through the brushed PMM when power is applied.

14. The apparatus as defined in claim 11, further comprising a switching circuit, the switching circuit coupled to two or more motors and to the measurement circuit such that a single measurement circuit can measure the back-emf voltage of the two or more motors.

15. The apparatus as defined in claim 11, wherein the measurement circuit is configured to measure the back-emf voltage from the brushed PMM in a differential manner.

16. An apparatus for ascertaining an operating condition of a brushed permanent magnet motor (brushed PMM), the apparatus comprising:
a controller configured to permit power to be applied to the brushed PMM motor when motorized power is desired, the controller further configured to be able to deactivate the power applied to the brushed PMM;
a measurement circuit configured to measure a back-emf voltage emanating from the PMM when the PMM is powered off; and
an index sensor, wherein the controller is configured to adaptively adjust a scaling factor used to compute position with the measured back-emf voltage at least partially in response to a detection of an index marker to correct drift
wherein the controller is configured to integrate the measured back-emf voltage over time to estimate a position of a motor shaft of the brushed PMM.

17. The apparatus as defined in claim 16, wherein the apparatus comprises a motorized device.

18. The apparatus as defined in claim 16, further comprising an A/D converter, wherein the controller is further configured to compensate for a DC offset in the A/D converter's measurement of the back-emf voltage.

19. The apparatus as defined in claim 16, wherein the apparatus comprises a robot.

20. An apparatus for ascertaining an operating condition of a brushed permanent magnet motor (brushed PMM) of a robot, the apparatus comprising:
means for applying power to the brushed PMM when motorized power is desired;
means for deactivating the power applied to the brushed PMM;
means for measuring a back-emf voltage of the brushed PMM while power is deactivated, wherein the measuring means further comprises means for compensating for a DC offset in the measured back-emf voltage; and
means for integrating the measured back-emf voltage over time to estimate a position of a motor shaft of the brushed PMM for feedback control of the robot.

* * * * *